United States Patent
LaPorte et al.

(10) Patent No.: US 7,236,863 B2
(45) Date of Patent: Jun. 26, 2007

(54) DOCKING STATION FOR A VEHICLE

(75) Inventors: Alexandre LaPorte, Les Adrets (FR); Christophe Le Rouzo, Houston, TX (US); Dominique Vicard, Bernin (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 169 days.

(21) Appl. No.: 10/878,043

(22) Filed: Jun. 29, 2004

(65) Prior Publication Data

US 2005/0047081 A1    Mar. 3, 2005

(30) Foreign Application Priority Data

Jul. 3, 2003    (EP)    ................... 03291654

(51) Int. Cl.
*G06F 3/00*    (2006.01)
(52) U.S. Cl. .................... 701/36; 361/686; 710/303
(58) Field of Classification Search ................ 361/686; 701/36
See application file for complete search history.

(56) References Cited

U.S. PATENT DOCUMENTS 5,289,321 A * 2/1994 Secor ........................ 359/896
5,555,491 A    9/1996 Tao
5,966,115 A    10/1999 Aoki
5,986,634 A    11/1999 Alioshin et al.
6,246,449 B1 *  6/2001 Rosen ........................ 348/837
6,400,561 B1    6/2002 Horton
6,472,771 B1 * 10/2002 Frese et al. ................. 307/10.1
2001/0035683 A1 * 11/2001 Yearwood et al. ......... 307/10.1
2002/0140289 A1   10/2002 Jarocha et al.
2003/0125846 A1 *  7/2003 Yu et al. ......................... 701/1
2004/0061995 A1 *  4/2004 McMahon ................... 361/681

FOREIGN PATENT DOCUMENTS

EP    1 260 794    11/2002

* cited by examiner

*Primary Examiner*—Lisa Lea-Edmonds
*Assistant Examiner*—Ingrid Wright
(74) *Attorney, Agent, or Firm*—Foley & Lardner LLP

(57) ABSTRACT

A docking station for a vehicle,
 the docking station being adapted to receive a portable computer,
 the docking station comprising mounting elements to mount the docking station in a vehicle,
 a holding element to hold a portable computer in engagement with the docking station, and
 a connection element to connect a portable computer in engagement with the docking station to a subsystem of the vehicle.

5 Claims, 3 Drawing Sheets

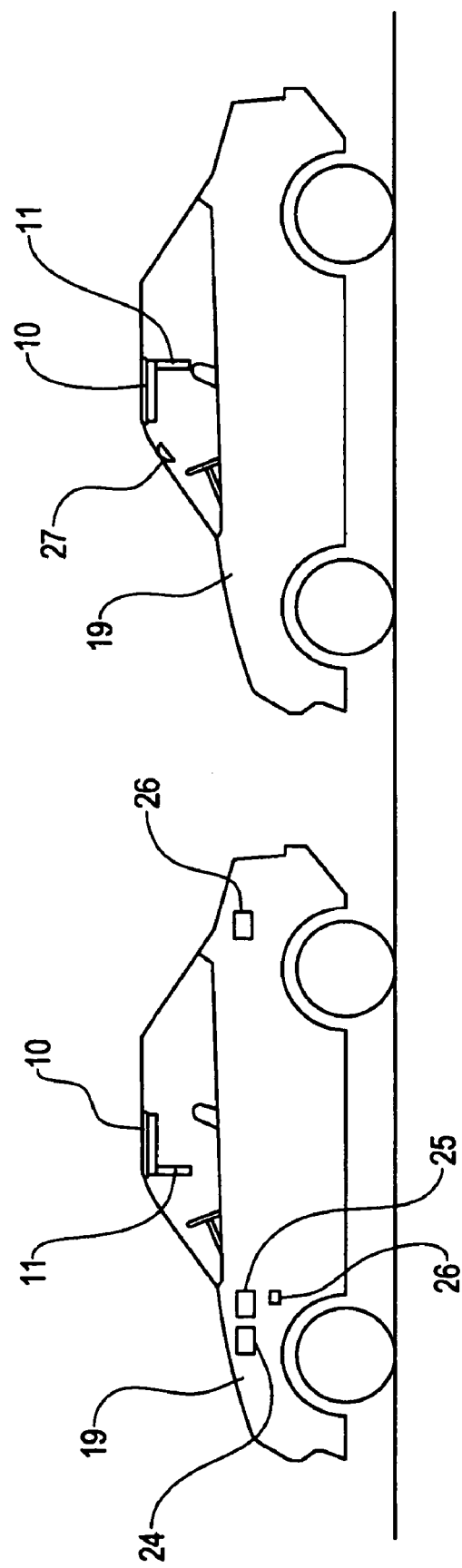

DOCKING STATION FOR A VEHICLE

FIELD OF THE INVENTION

This invention relates to a docking station for a vehicle, a portable computer adapted to engage the docking station, a vehicle provided with a docking station, and a method of displaying information to an occupant of the vehicle.

BACKGROUND OF THE INVENTION

As vehicles become more sophisticated, it is known to provide a variety of electrical and electronic systems and subsystems in a vehicle to perform different functions. For example, most vehicles have an electronic engine management system, audio equipment such as a radio, an audio cassette or a CD player, trip computers and navigation computers, mobile phone holders and, in some cases, dedicated entertainment systems to allow games to be played or DVD's to be viewed, particularly mounted in the rear of seats. In general, these systems are all standalone and they have a limited set of specific functions. To vary the function of a system, is often necessary to completely replace the relevant system.

An aim of the present invention is to reduce or overcome one or more of the above problems.

SUMMARY OF THE INVENTION

According to a first aspect of the invention we provide a docking station for a vehicle, the docking station being adapted to receive a portable computer, the docking station comprising mounting elements to mount the docking station in a vehicle, a holding element to hold a portable computer in engagement with the docking station, and a connection element to connect a portable computer in engagement with the docking station to a subsystem of the vehicle, wherein the mounting elements are adapted to mount the docking station to an underside of a roof of the vehicle.

The connection element may be operable to connect a power input of the portable computer to a power supply system of the vehicle.

The connection element may be operable to connect the portable computer to one or more subsystems, wherein the subsystems comprise one or more of; an engine management system, a mobile phone holder, speakers and a navigation system.

According to a second aspect of the invention we provide a portable computer adapted to engage a docking station according to the first aspect of the invention, the portable computer comprising a screen and being operable to generate a display on the screen, wherein the portable computer is operable to generate an inverted display on the screen.

The portable computer may be operable to generate a display, wherein the display is reversed about a vertical axis of the screen.

According to a third aspect of the invention we provide a method of displaying information to an occupant of a vehicle comprising engaging a portable computer in a docking station provided on the underside of a roof of a vehicle, the portable computer being disposed in an inverted position, the portable computer comprising a screen, wherein the method further comprises the steps of generating a display to be displayed on the screen, and inverting the display such that it appears to be correctly oriented to an occupant of the vehicle.

The method may comprise further disposing the portable computer such that the screen is visible in a rear view mirror of the vehicle, and reversing the display about a vertical axis such that the display appears correctly oriented when viewed in the rear view mirror.

BRIEF DESCRIPTION OF THE DRAWINGS

Embodiments of the present invention will now be described by way of example with reference to the accompanying drawings, wherein:

FIG. 3*a* is a diagrammatic side view of the vehicle of FIG. 2, and, FIG. 3*b* is a diagrammatic side view of a further vehicle embodying the present invention.

DESCRIPTION OF THE PREFERRED EMBODIMENTS

Figure 1:
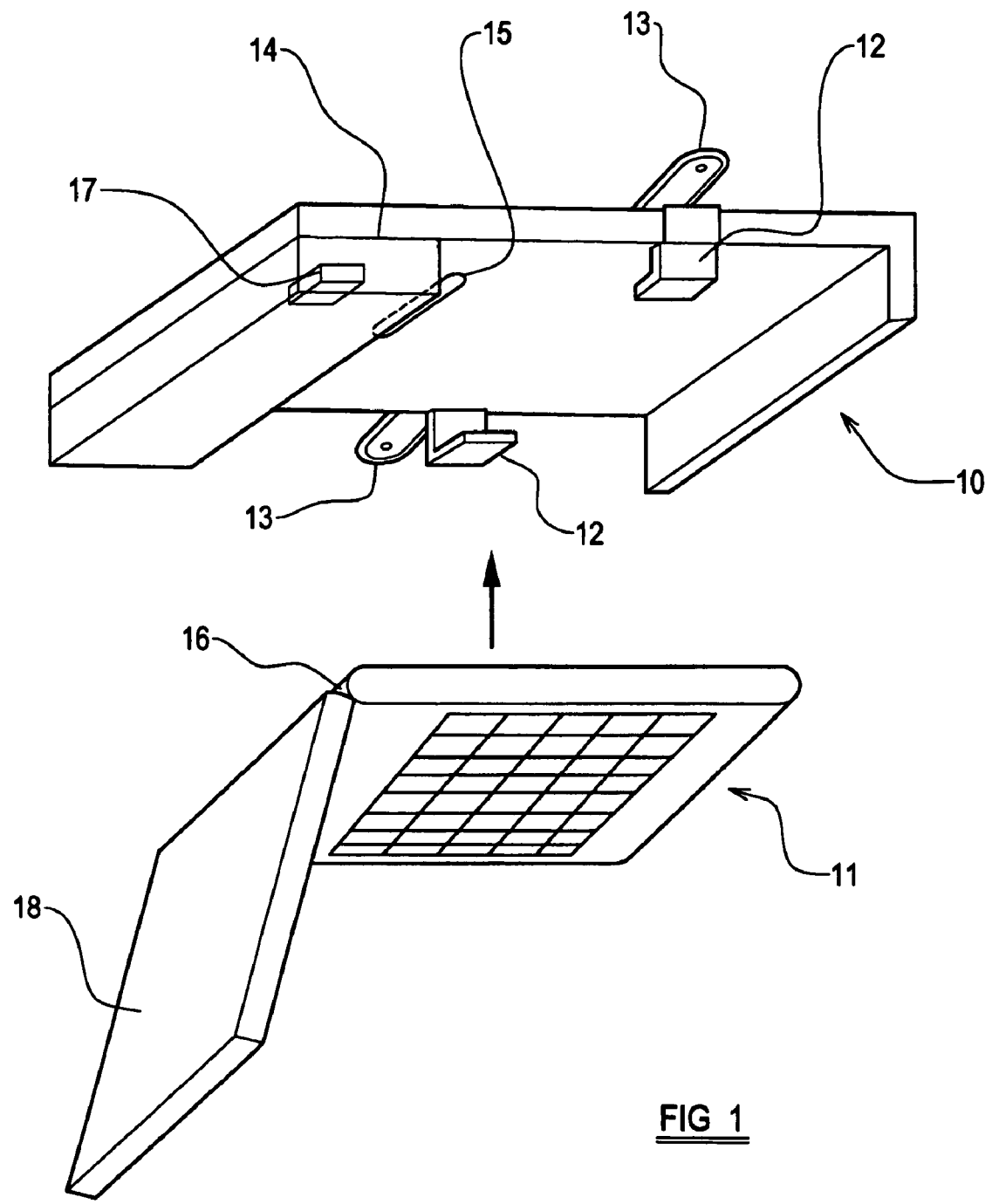
FIG. 1 is a perspective view of docking station and laptop embodying the present invention.

Referring to FIG. 1, an example of a docking station embodying the invention is shown at 10, adapted to receive a portable computer such as a laptop shown at 11. The docking station 10 has holding means 12 to hold the portable computer 11 in engagement with the docking station 10, in this example displaceable clips to engage the sides of the computer 11. The docking station 10 further has mounting means 13 to mount the docking station 10 in position on the vehicle, and a connection means generally illustrated at 14 to connect the laptop to a subsystem of the vehicle. The connecting element may comprise a physical connection such as that shown at 15 to engage sockets shown at 16 on the back of the computer 11, or may comprise a wireless connection such as an infrared link or a radio link such as Bluetooth. It may be envisaged that the physical connection 15 includes a power connection to engage a power input of the computer 11 and connected to a power supply system of the vehicle such a power connection can power the computer 11 and also recharge a battery of the computer 11. Indeed both a physical connection 15 and a wireless connection 17 could be provided to provide a data connection between the computer 11 and a vehicle subsystem.

Figure 2:
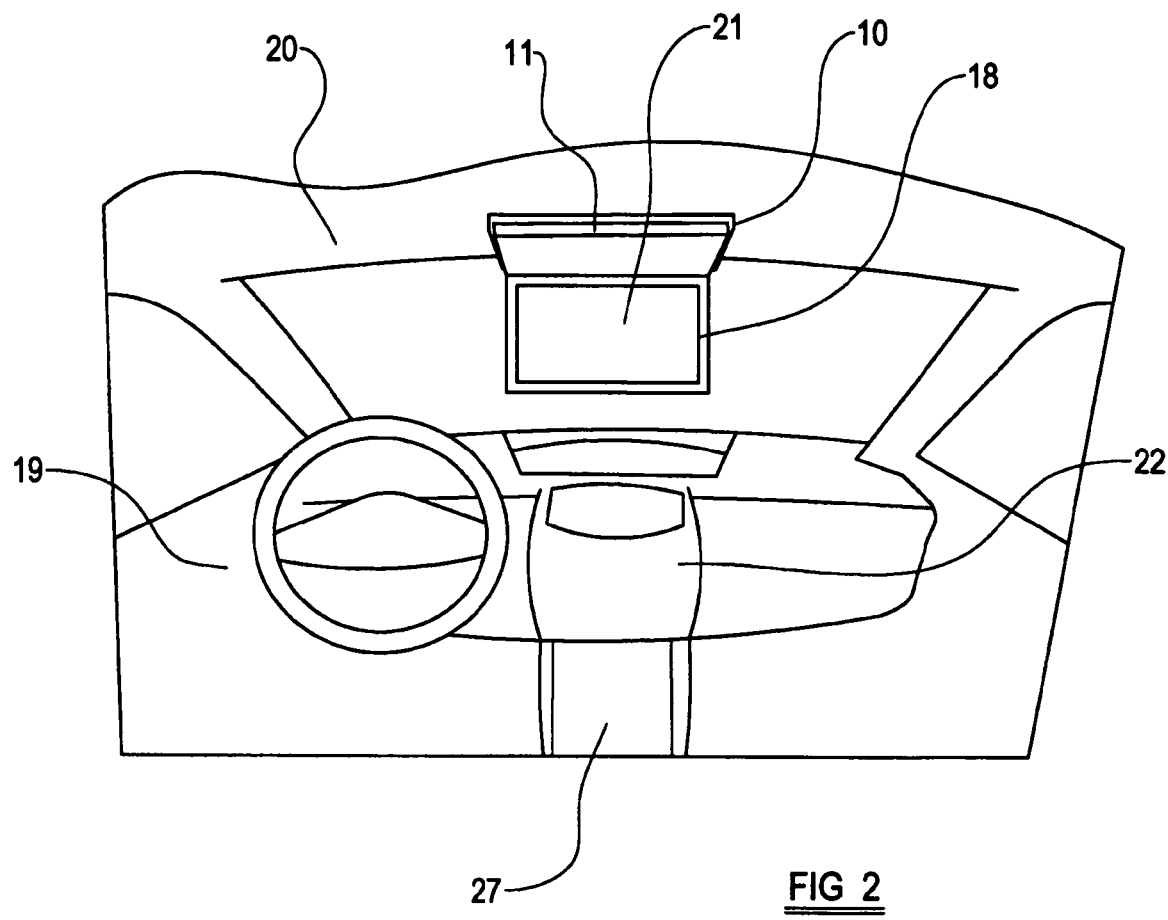
FIG. 2 is a view of the interior of a vehicle provided with the docking station and portable computer of FIG. 1.

A view of a vehicle interior is shown in FIG. 2. In this example, the vehicle 19 has a roof 20 and the docking station 10 is mounted on the underside of the roof 20. The computer 11 is then engaged with the docking station 10 with its screen 18 disposed generally vertically facing rearwardly of the vehicle. So that the display 21 shown on the screen 18 appears in the correct orientation to the occupants of the vehicle, the display 21 is inverted, i.e. rotated through 180° such that it appears the correct way up when viewed by the occupant of the vehicle. The display may be rotated in known manner by a suitable graphics controller of the computer 11. The computer 11 may be instructed to invert the display by operating the user selecting an option, or may be instructed to invert the display as a result of an instruction received from the docking station 10, or it may indeed that the computer be operable to detect that it is inverted and orient the display 21 accordingly.

The docking station 10 is located such that a computer 11 received in the docking station 10 is located between front seats of the vehicle 19 such that the view out of the windscreen is sufficiently unobstructed for the driver to be able to drive the vehicle safely and so the display 18 is viewable by passengers of the vehicle.

With reference to FIG. 3*a*, when the computer 11 is received in the docking station 10 it permits a broader variety of functions to be offered to a user and lets the computer 11 to interface with other subsystems on the vehicle. In the example of FIGS. 2 and 3*a*, the computer 11 can interface with an engine management system generally shown at 24, an audio system generally shown at 25, vehicle speakers generally shown at 26 or a navigation system generally shown at 27 or indeed any other subsystem as required such as a mobile phone holder to provide a mobile telephone network connection or indeed any other function as desired. The computer 11 can then display information from the subsystem such as navigation information, information from a trip computer, engine status information such as information that a car component is about to fail and, via the navigation console 27, provide directions to the nearest garage, computer games, play DVDs for the benefit of passengers or indeed provide any other computer function to a user in the vehicle such as email or otherwise. The computer 11 may receive GPS signals, whether from a navigation console or otherwise and may communicate with subsystems of the vehicle via physical electrical connections or via a wireless connection or otherwise. It might be envisaged that the users are provided with appropriate control devices such as a joy pad for gaming or a wireless keyboard or a remote control similar to a television remote control device or otherwise. The computer 11 could directly interface with the car speakers to provide entertainment, or communicate via the audio system as appropriate. On finding a mobile phone connection, it is apparent that the computer 11 can send and receive information and data for any appropriate function and indeed, where the computer is connected to an engine management system 24, can transmit data to the car manufacturer or to a car maintenance centre or otherwise as desired.

In an alternative arrangement as shown in FIG. 3*b*, the computer 11 is disposed such that the screen 18 faces forwardly of the vehicle and is visible to an occupant of a front seat of the vehicle 19 in a rear-view mirror as shown at 27. The display 25 is then not only inverted, to appear the right way up, but is reversed about An vertical axis of the screen such that the display 21 appears correctly oriented when viewed in the mirror 27. In this way the screen 18 does not provide any obstruction to the forward vision of the driver.

To provide the two orientations shown in FIGS. 3*a* and 3*b*, it would be apparent that the docking station 10 could be adapted to provide either orientation. Alternatively, the laptop could be provided with a pair of screens as discussed in our co pending application number (HP50016925).

Although in the present example the vehicle is a car, it will be apparent that the docking station may be provided in any appropriate vehicle and in any suitable position as desired.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A docking station for a vehicle, the docking station being adapted to receive a portable computer, comprising a screen and being operable to generate a display on the screen, wherein the portable computer is operable to generate an inverted display on the screen and wherein the display is capable of being reversed about a vertical axis of the screen such that the display faces the front of the vehicle and a reflection of the display is visible in a rear view mirror of the vehicle, wherein the display on the screen appears correctly oriented when viewed in the rear view mirror of the vehicle;

the docking station comprising mounting elements to mount the docking station in a vehicle, a holding element to hold a portable computer in engagement with the docking station, and a connection element to connect a portable computer in engagement with the docking station to at least one subsystem of the vehicle wherein the mounting elements are adapted to mount the docking station to an underside of the roof of the vehicle, the connection element being capable of connecting a power input of the portable computer to a power supply system of the vehicle, wherein the at least one subsystem comprises at least one of an engine management system and a navigation system.

2. A portable computer being adapted to engage a docking station, the portable computer comprising a screen and being operable to generate a display on the screen, wherein the portable computer is capable of generating an inverted display on the screen; and wherein the display is capable of being reversed about a vertical axis of the screen such that the display faces the front of the vehicle and a reflection of the display is visible in a rear view mirror of the vehicle, wherein the display on the screen appears correctly oriented when viewed in the rear view mirror.

3. A vehicle comprising a docking station according to claim 1.

4. A method of displaying information to the occupant of a vehicle comprising engaging a portable computer in a docking station provided on the underside of a roof of a vehicle, the laptop being disposed in an inverted position, the portable computer comprising a screen, the method further comprises steps of:

generating a display to be displayed on the screen, and inverting the display such that it appears to be correctly oriented to an occupant of the vehicle, by disposing the portable computer such that the screen is visible in a rear view mirror of the vehicle, and by reversing the display about a vertical axis such that the display faces the front of the vehicle and a reflection of the display is visible in a rear view mirror of the vehicle, wherein the display display on the screen appears correctly oriented when viewed in the rear view mirror.

5. A vehicle comprising a docking station the docking station being adapted to receive a portable computer, comprising a screen and being operable to generate a display on the screen, wherein the portable computer is operable to generate an inverted display on the screen and wherein the display is capable of being reversed about a vertical axis of the screen such that the display faces the front of the vehicle and a reflection of the display is visible in a rear view mirror of the vehicle, wherein the display on the screen appears correctly oriented when viewed in the rear view mirror of the vehicle;

the docking station comprising mounting elements to mount the docking station in a vehicle, a holding element to hold a portable computer in engagement with the docking station, and a connection element to connect a portable computer in engagement with the docking station to a subsystem of the vehicle wherein: the mounting elements are adapted to mount the docking station to an underside of the roof of the vehicle; the connection element is operable to connect a power input of the portable computer to a power supply system of the vehicle; and the connection element is operable to connect the portable computer to one or more subsystems, wherein the subsystems comprise one or more of an engine management system and a navigation system.

* * * * *